(12) United States Patent
Wissen

(10) Patent No.: US 7,507,892 B1
(45) Date of Patent: Mar. 24, 2009

(54) MUSICAL NOTE READING METHOD AND WRITTEN EXERCISES

(76) Inventor: Kelly Walsh Wissen, 14587 Heights Blvd., Jupiter, FL (US) 33458

(*) Notice: Subject to any disclaimer, the term of this patent is extended or adjusted under 35 U.S.C. 154(b) by 11 days.

(21) Appl. No.: 11/807,512

(22) Filed: May 29, 2007

(51) Int. Cl.
*G09B 15/00* (2006.01)

(52) U.S. Cl. .................................................. 84/470 R
(58) Field of Classification Search ............... 84/470 R, 84/483.1, 483, 2, 484, 485

See application file for complete search history.

(56) References Cited

U.S. PATENT DOCUMENTS

| | | |
|---|---|---|
| 6,259,013 B1 | 7/2001 | Walsh |
| 6,388,182 B1 * | 5/2002 | Bermudez .................. 84/477 R |

\* cited by examiner

*Primary Examiner*—Kimberly R Lockett
(74) *Attorney, Agent, or Firm*—McCracken & Frank LLP

(57) ABSTRACT

A method that facilitates the learning process of musical note reading which is exhibited in a series of written exercises. Musical notes, letters of the alphabet, numbers, and symbols are arranged in a specific order on musical staffs that consist of five, equidistant, horizontal lines. Each staff begins with a musical clef. When each note is correctly identified and translated into the appropriate letter of the musical alphabet, either a, b, c, d, e, f, or g, the answers, in combination with the alphanumeric characters and symbols, will form recognizable words.

8 Claims, 3 Drawing Sheets

MUSICAL NOTE READING METHOD AND WRITTEN EXERCISES

FIELD OF THE INVENTION

The present invention relates to music education, specifically a method that facilitates the learning process of musical note reading and written exercises therefor.

BACKGROUND OF THE INVENTION

Virtually every publisher of musical material offers some kind of note recognition workbook. These books usually have the same format; individual notes are printed with an answer line underneath each note. The student determines the letter names of the notes, either a, b, c, d, e, f, or g, and writes his answers on the lines provided. The notes usually have no correlation to each other and are chosen and printed at random. This method often fails the student because of its tiresome, didactic approach.

Other work books employ the same style (notes with answer lines underneath), but in attempt to create student interest the notes are printed in a specific order. If the student correctly identifies the letter names of the notes, the answers will spell words such as "ace" or "beg". This format, also, often fails the student when he tires of forming arbitrary words. Furthermore, because there are few words that can be formed from the musical alphabet, a through g, the answers form the same words, repetitiously, throughout the book.

SUMMARY

As shown in my earlier U.S. Pat. No. 6,259,013, the method presented therein offers several features that make it a more effective format for learning than other methods previously written. It allows for less repetition of answer words by including all letters of the alphabet in the exercises. For example, one exercise may include an h. t, or k; these are letters that are not in the musical alphabet, but when combined with the letters that are in the musical alphabet, a through g, a great variety of words can be formed.

My improved method presented in this application, in addition to including letters of the alphabet along with the musical notes, also includes numbers and conventional, easily recognizable symbols such as @ and &. The reasons for these necessary additions are detailed in the concluding paragraphs of Objects and Advantages.

This method is a great improvement over those previously written by others because it offers the opportunity for the student to self-correct his own work. The exercises are separated into groups. In each group, the answer words pertain to the same topic. Because the student knows that each group of exercises has the same topic, he will know if he has incorrectly identified a note's letter name because the word that was formed by his answers and the characters given will not be recognizable, nor will it relate to the topic of the group. For example, if a student is working on a group of exercises titled "Animals", and the word he forms spells b-a-d-g-e-r, he will know that he as correctly identified each note because a badger is an animal. This is a great advantage over other methods because the student can identify and correct his mistakes immediately. Because other methods do not group exercises into common topics, they require a music teacher, or a person familiar with note reading to correct mistakes. If a teacher is not readily available, the student may assimilate the incorrect answers. Therefore, it is an object of the present invention to provide a musical note reading method that helps students identify the letter names of musical notes quickly and accurately.

It is an additional object of the present invention to provide a musical note reading method that includes repetition, without redundancy, as a learning device. Most previously written exercises are pedantic. Notes are printed at random with an answer line underneath each note for the student to write her answer. Others rely on the letter names of the musical notes, only, to spell arbitrary words. The resulting answer words can only be made from the letters a, b, c, d, e, f, or g. Because there are few words that can be formed from these five consonants and two vowels, the average student can usually guess the answers, if she doesn't tire of the exercises and abandon them first. The present method includes repetition without redundancy in its exercises. Although the answer words are rarely repeated, the same notes recur continually throughout the exercises. The student is usually unaware of this repetition because her attention is diverted to the enjoyable process of word formation. The student will identify the letter names of the notes progressively faster as she progresses through the exercises.

It is still a further object of the present invention to provide a musical note reading method that will motivate the student to progress. A student of any subject will learn faster and with less effort if he enjoys the material. This method was designed to be an entertaining approach to learning musical note reading. This is accomplished in part through educational games such as word search and word games. These exercises, unlike those previously written, are not pedantic. Therefore, the student is mostly unaware of the effort associated with learning how to read music.

As previously stated, this improved method offers features not presented in my 2001 patent. The addition of numbers and symbols to the exercises was necessary to make the method more effective. These additions were necessary, firstly, to further obscure the answer words in the exercises, thereby eliminating the possibility of a student correctly guessing the answers. My method patented in 2001 sometimes failed the student who could accurately guess the answer words after deciphering only the first few letters of the word. The student would, quite often, inaccurately guess how to spell the answer word she deduced, thus misidentifying the remaining notes in the exercise. Adding numbers and symbols to the letters in the exercises helps to obscure the answer words because the answer word is not revealed until all the notes are correctly identified and the resulting cipher is heard phonetically. For example, in the word "gratitude", the "at" sound would be represented by the symbol @, and the "tu" sound would be represented by the number 2.

Secondly, these additions were necessary to provide a more extensive selection of answer words. Because this method is based on the doctrine of employing repetition without redundancy to facilitate note reading, the same notes must recur continually throughout the exercises while the answer words must vary. The inclusion of symbols and alphanumeric characters along with the musical notes allow for an almost limitless supply of answer words.

Thirdly, these additions were necessary to create more challenging exercises for the older beginning student of music. My method patented in 2001 often failed to interest the older student who would assume the exercises were too elementary based on their somewhat rudimentary appearance. The combination of alphanumeric characters, symbols and notes becomes a musical cryptogram that is enjoyable yet challenging to decipher. This fulfills a main objective of this method; provide interesting exercises that will hold a student's attention thus making the task of learning how to read music much easier and more enjoyable. Further objects and advantages of my invention will become apparent from a consideration of the drawings and ensuing description.

In accordance with the present invention a method of written exercises comprises musical notes, musical staffs, alphanumeric characters and conventional symbols.

DRAWINGS

Figures

DETAILED DESCRIPTION OF THE DRAWINGS

FIGS. 1, 2, 3

While certain examples of the invention are shown here, this patent is not limited to these specific arrangements.

Figure 1:
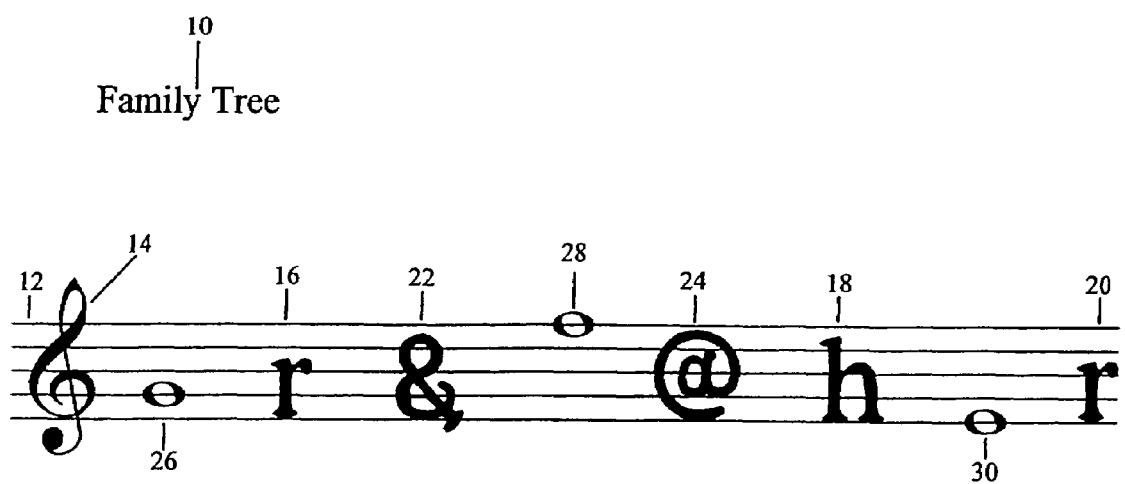
FIG. 1 shows one exercise from the "Family Tree" work-sheet.

In reference to FIG. 1, one exercise from the work-sheet "Family Tree" is shown. A title 10 for the work-sheet is printed above the exercise. A staff 12, five equidistant horizontal lines (a standard musical component), begins with a treble clef 14 (a standard musical symbol). A letter r 16, a letter h 18, and another letter r 20 is printed along with an ampersand 22, an @ symbol 24, and three musical notes 26, 28, 30.

Figure 2:
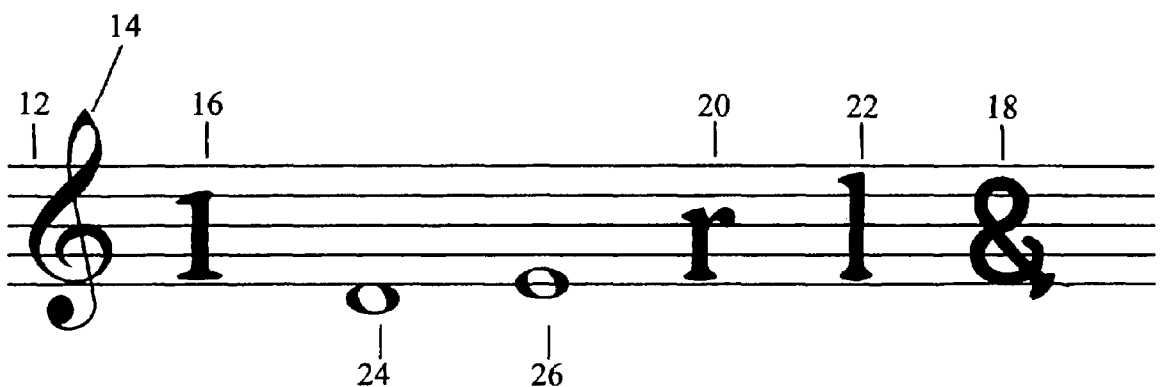
FIG. 2 shows one exercise from the "Fairytale Places" work-sheet.

In reference to FIG. 2, one exercise from the work-sheet "Fairytale Places" is shown. A title 10 is printed above the exercise. A staff 12 begins with a treble clef 14. A number 1 16 and an ampersand 18 is printed along with the letters r 20 and l 22, and two musical notes 24, 26.

Figure 3:
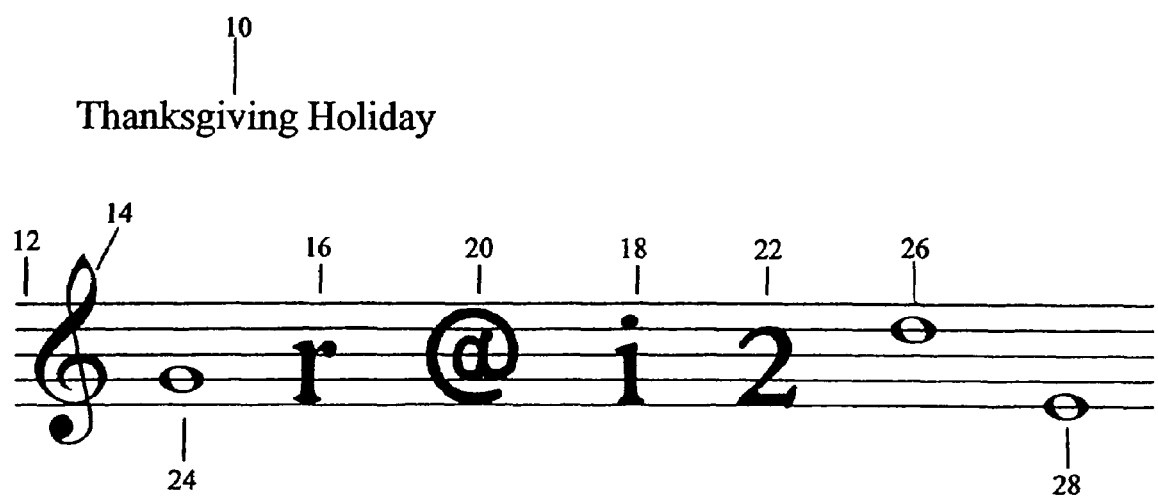
FIG. 3 shows one exercise from the "Thanksgiving Holiday" work-sheet.

In reference to FIG. 3, one exercise from the work-sheet "Thanksgiving Holiday" is shown. A title 10 is printed above the exercise. A staff 12 begins with a treble clef 14. The letters r 16 and i 18 are printed along with an @ symbol 20, the number 2 22, and three musical notes 24, 26, 28.

OPERATION OF THE INVENTION

FIGS. 1, 2, 3

In FIG. 1. an exercise from the work-sheet "Family Tree" is shown. After reading the title 10, the student will know that in the exercises that follow, his answers should relate in some way to members of a family. The staff 12, has a treble clef 14 at the beginning. The staff 12 and the clef 14 are standard musical components and should be recognizable to a music student. The letters r 16, h 18, and another r 20 are printed along with an ampersand 22, an @ symbol 24, and three musical notes 26, 28, 30. The student should identify the first note 26 as g. He will write the letter g near the first note 26. The student should then determine that the second note 28 is f, and proceed to write the letter f near the second note 28. The last note 30 should be identified as e, and the letter e should then be written near the last note 30. After the notes 26, 28, 30 are identified, the student would then proceed to translate the symbols 22, 24 into the words they represent. The ampersand 22 should be identified as being the symbol for "and". The student should then write the word "and" near the ampersand 22. He would then identify the @ symbol 24 as representing the word "at", and write the word "at" near the @ symbol 24. With the notes 26, 28, 30 being properly identified as g, f, and e, and the symbols 22, 24 being properly identified as "and" and "at", the student can then determine that the answer word phonetically formed by the notes 26, 28, 30, the letters 16, 18, 20, and the symbols 22, 24 is "grandfather" (note G 26, letter R 16, symbol AND 22, note F 28, symbol AT 24, letter H 18, note E 30, letter R 20). Since a grandfather is a member of a family tree, the title 10 of the exercise, the student will know that he has correctly identified the three notes 26, 28, 30.

In FIG. 2, an exercise from the work-sheet "Fairytale Places" is shown. After reading the title 10, the student will know that in the exercises that follow, her answers should relate in some way to a place mentioned in a fairytale or perhaps the setting of a fairytale. The staff 12, begins with a treble clef 14. A number 1 16, an ampersand 18, and the letters r 20 and l 22 are printed on the staff 12 along with two musical notes 24, 26. The student should determine that the first note 24 is d, and proceed to write the letter d near the first note 24. She should then identify the second note 26 as e, and proceed to write the letter e near the second note 26. After the notes 24, 26 are identified, the student would then proceed to the number 1 16. She would relate the number 16 to the word "one" and write "one" near the number 16 printed in the exercise. She would then identify the ampersand 18 as representing the word "and", and proceed to write the word "and" near the ampersand 18. With the notes 24, 26 being properly identified as d and e, the number 1 16 translated into the word "one", and the ampersand 18 translated into the word "and", the student can then determine the answer word phonetically formed by the notes 24, 26, the letters 20, 22, the number 16, and the symbol 18 is "wonderland" (number ONE (WON) 16, note D 24, note E 26, letter R 20, letter L 22, symbol AND 18). Because a wonderland could be associated with a fairytale, the title 10 of the exercise, the student will know that she has identified the two notes 24, 26 correctly.

In FIG. 3, an exercise from the work-sheet "Thanksgiving Holiday" is shown. After reading the title 10, the student will know that in the exercises that follow, his answers should relate in some way to Thanksgiving. The staff 12 begins with a treble clef 14. The letters r 16 and i 18 are printed along with the @ symbol 20 and the number 2 22. Three musical notes 24, 26, 28 are shown as well. The student should identify the first note 24 as g, the second note 26 as d, and the third note 28 as e, and proceed to write the letters g, d, and e near the notes 24, 26, 28. He would determine that the @ symbol 20 represents the word, "at", and write "at" near the symbol 20. The student would then relate the printed number 2 22 to the word "two" and write "two" near the number 22 in the exercise. With the notes 24, 26, 28 being properly identified as g, d, and e, the symbol 20 properly identified as "at", and the number 22 translated into the word "two", he can then determine that the answer word phonetically formed by the notes 24, 26, 28, the symbol 20, the number 22, and the letters 16, 18, is "gratitude" (note G 24, letter R 16, symbol AT 20, letter I 18, number TWO (TU) 22, note D 26, note E 28). Because the word "gratitude" could be associated with the Thanksgiving Holiday, the title 10 of the exercise, the student will know that he has correctly identified the three notes 24, 26, 28.

CONCLUSION, RAMIFICATIONS, AND SCOPE OF INVENTION

Accordingly, the reader will see that this invention provides a musical note reading method that helps music students identify the letter names of musical notes quickly and accurately by offering repetition without redundancy, by offering the student the opportunity to self-correct his work, and by offering a motivating, entertaining way of learning.

While the description above contains many specificities, these should not be construed as limitations on the scope of the invention, but as exemplifications of the presently preferred embodiments thereof. Many other ramifications and variations are possible within the teachings of the invention. For example, there could be many exercises under one title, answer words could be repeated under separate titles, the titles could be eliminated, the staffs, clefs, notes, alphanumeric characters, symbols, or titles could be made smaller or larger, the staffs could be divided into segments or not divided at all, illustrations or color could be added, letters, symbols or numbers could be omitted from some answer words, answer lines could be added near the notes, the notes could be changed from whole notes (as shown) to notes of a different value, the characters printed within the staff could be moved above or below the staff or to an answer line, or the exercises could be shown on a computer screen, rather than on paper. Thus the scope of the invention should be determined by the appended claims and their legal equivalents, and not by the examples given.

I claim:

1. A method of written exercises to facilitate the learning process of music reading, comprising the steps of:
    (a) providing a plurality of musical staffs, musical notes, letters of the alphabet, numbers, and symbols; and
    (b) arranging said musical notes, said letters of the alphabet, said numbers, and said symbols in an order that will cause a student's answer to phonetically create a word when said musical notes are correctly translated into the letters a, b, c, d, e, f, or g in combination with phonetic equivalents of the numbers and symbols.

2. The method of claim 1 further comprising the step of:
    (c) providing a topic description, wherein the word relates to the topic description.

3. A written exercise for facilitating the learning process of reading music, comprising:
    a musical staff;
    at least one musical note arranged on the musical staff;
    at least one letter of the alphabet arranged on the musical staff; and
    at least one number arranged on the musical staff;
    wherein the musical note, the letter of the alphabet, and the number are arranged in an order that phonetically creates a word when the musical note is correctly translated into an appropriate letter a, b, c, d, e, f, or g, in combination with the letter and a phonetic equivalent of the number.

4. The written exercise of claim 3 further comprising at least one symbol arranged on the musical staff, wherein the symbol is arranged with the musical note, the letter of the alphabet, and the number in a manner that phonetically creates a word in combination with the musical note, the letter, the phonetic equivalent of the number, and a phonetic equivalent of the symbol.

5. The written exercise of claim 3 further including a topic identifier, wherein the word relates to the topic identifier.

6. A written exercise for facilitating the learning process of reading music, comprising:
    a musical staff;
    at least one musical note arranged on the musical staff;
    at least one letter of the alphabet arranged on the musical staff;
    at least one symbol arranged on the musical staff;
    wherein the musical note, the letter of the alphabet, and the symbol are arranged in an order that phonetically creates a word when the musical note is correctly translated into an appropriate letter a, b, c, d, e, f, or g, in combination the letter and a phonetic equivalent of the symbol.

7. The written exercise of claim 6 further comprising at least one number arranged on the musical staff, wherein the number is arranged with the musical note, the letter of the alphabet, and symbol number in a manner that creates a word in combination with a phonetic equivalent of the number.

8. The written exercise of claim 7 further including a topic identifier, wherein the topic identifier is related to the word.

\* \* \* \* \*